(12) United States Patent
de Nie et al.

(10) Patent No.: US 10,317,986 B2
(45) Date of Patent: Jun. 11, 2019

(54) CONTROLLER

(71) Applicant: NXP B.V., Eindhoven (NL)

(72) Inventors: Robert Henri de Nie, Culemborg (NL); Wilhelmus Hinderikus Maria Langeslag, Wijchen (NL); Peter Laro, Wijchen (NL)

(73) Assignee: NXP B.V., Eindhoven (NL)

( * ) Notice: Subject to any disclaimer, the term of this patent is extended or adjusted under 35 U.S.C. 154(b) by 92 days.

(21) Appl. No.: 15/396,570

(22) Filed: Dec. 31, 2016

(65) Prior Publication Data
US 2017/0235359 A1 Aug. 17, 2017

(30) Foreign Application Priority Data

Jan. 29, 2016 (EP) .................................... 16153511
Feb. 25, 2016 (EP) .................................... 16157461

(51) Int. Cl.
*G06F 1/26* (2006.01)
*G06F 1/3296* (2019.01)
*G06F 13/38* (2006.01)
*G06F 13/42* (2006.01)
*H02M 3/335* (2006.01)
*H02J 7/00* (2006.01)
(Continued)

(52) U.S. Cl.
CPC ............ *G06F 1/3296* (2013.01); *G06F 1/266* (2013.01); *G06F 13/385* (2013.01); *G06F 13/4282* (2013.01); *H02M 3/33523* (2013.01); *H02J 2007/0062* (2013.01); *H02M 2001/0025* (2013.01); *H02M 2003/1566* (2013.01)

(58) Field of Classification Search
CPC ...... G06F 1/3296; G06F 1/266; G06F 13/385; G06F 13/4282; H02M 3/33523; H02M 2001/0025; H02M 2003/1566; H02J 2007/0062
USPC ......................................................... 713/310
See application file for complete search history.

(56) References Cited

U.S. PATENT DOCUMENTS

9,923,396 B2 * 3/2018 Lei ........................ H02J 7/0052
2004/0189273 A1 9/2004 Imai et al.
(Continued)

*Primary Examiner* — Austin Hicks (57) ABSTRACT

A secondary side controller for a power converter configured to provide a control signal to an emitter element of an opto-coupler for control of a primary side controller of the power converter, the secondary side controller configured to operate with the primary side controller for controlling the voltage output of the power converter, the secondary side controller configured to, based on;
a first control value configured to instruct the power converter to output its present voltage output; and
a second control value configured to instruct the power converter to provide a requested target voltage output;
provide said control signal in accordance with a transition profile over a predetermined transition time period to effect a change between the first control value and the second control value, the transition profile comprising at least a first rate of change in the control signal followed by an end time period leading to the end of the transition time period during which the rate of change in the control signal is less than a threshold rate based on a characteristic of the opto-coupler and/or the power converter with which the controller is rated to operate, the first rate of change greater than the threshold rate of change.

15 Claims, 6 Drawing Sheets

(51) Int. Cl.
*H02M 1/00* (2006.01)
*H02M 3/156* (2006.01)

(56) References Cited

U.S. PATENT DOCUMENTS

| | | | |
|---|---|---|---|
| 2004/0218319 A1* | 11/2004 | Sae-Ueng | H02M 1/36 |
| | | | 361/18 |
| 2006/0072253 A1* | 4/2006 | Rozen | G06F 1/3203 |
| | | | 361/18 |
| 2010/0045247 A1* | 2/2010 | Blanken | H03F 3/211 |
| | | | 323/273 |
| 2012/0243271 A1 | 9/2012 | Berghegger | |
| 2014/0320327 A1 | 10/2014 | Fan et al. | |

* cited by examiner

CONTROLLER

CROSS-REFERENCE TO RELATED APPLICATIONS

This application claims the priority under 35 U.S.C. § 119 of European patent application no. 16157461.1, filed Feb. 25, 2016 and European patent application no 16153511.7, filed Jan. 29, 2016 the contents of which are incorporated by reference herein.

The present disclosure relates to secondary side controller for a power converter. In particular, it relates to a secondary side controller configured to provide a control signal to an opto-coupler, said opto-coupler configured to provide a feedback signal to a primary side controller of the power converter. The present disclosure also relates to a combination of a secondary side controller and an emitter element of an opto-coupler. The present disclosure also relates to a power converter including the secondary side controller. The present disclosure also relates to a Universal Serial Bus (USB) charger. The present disclosure also relates to a method of providing a transition between an initial voltage output by a power converter and a requested target voltage.

According to a first aspect of the present disclosure there is provided a secondary side controller for a power converter configured to provide a control signal to an emitter element of an opto-coupler for control of a primary side controller of the power converter, the secondary side controller configured to operate with the primary side controller for controlling the voltage output of the power converter, the secondary side controller configured to operate in combination with an opto-coupler and configured to, based on;
- a first control value configured to instruct the power converter to output its present voltage output; and
- a second control value configured to instruct the power converter to provide a requested target voltage output;
- provide said control signal in accordance with a transition profile over a predetermined transition time period to effect a change between the first control value and the second control value, the transition profile comprising at least a first rate of change in the control signal followed by an end time period leading to the end of the transition time period during which the rate of change in the control signal is less than a threshold rate, the threshold rate and/or the size of the end period based on a characteristic of the opto-coupler and/or the power converter with which the controller is configured to operate, the first rate of change greater than the threshold rate of change.

In one or more embodiments, the predetermined transition time period is based on a (USB for example) charging standard defining the maximum time for a transition to a requested target voltage.

Accordingly, in one or more embodiments, the secondary side controller is provided in combination with or defined to operate with a specific opto-coupler or power converter of known performance characteristics.

In one or more embodiments, the second control value is configured to be derived from signalling received from a load connectable to the power convertor for receiving power therefrom. Thus, the load may request a specific voltage transition.

In one or more embodiments, one or more of the first rate of change, the threshold rate and the end time period are selected with the aim of preventing the emitter element of the opto-coupler being in a saturated state at the end of the transition time period. In one or more embodiments, one or more of the first rate of change, the threshold rate and the end time period are selected with the aim of preventing an integrator of a feedback element (of which the opto-coupler may be part) integrating incorrect values at the end of the transition time period.

In one or more embodiments, the first rate of change and/or the threshold rate is non-zero.

In one or more embodiments, the secondary side controller is provided independently of the opto-coupler and is rated to operate with a specific opto-coupler.

In one or more embodiments the temporal size of end time period is at least 5%, 10%, 20%, 30%, 40% or 50% or more of the transition time period.

In one or more embodiments the transition profile comprises a progressive reduction in the rate of change in the control signal over at least 50% of the transition time period, such as during the end time period. In one or more embodiments, the transition profile comprises a progressive reduction in the rate of change in the control signal over substantially all of the transition time period. In one or more embodiments, the transition profile comprises a progressive reduction in the rate of change in the control signal over substantially 10%, 20%, 30%, 40%, 50%, 60%, 70%, 80%, 90% or 95% of the transition time period. In one or more embodiments, said progressive reduction occurs in the end time period.

In one or more embodiments, the transition profile comprises a progressive reduction in the rate of change in the control signal over at least the end time period, the end time period comprising at least 10% of the transition time period. In one or more embodiments, the end time period comprises at least 5%, 15%, 20%, 30%, 40%, 50% of the transition time period.

In one or more embodiments the transition profile provides for step-wise changes in the control signal.

In one or more embodiments, the first rate of change is provided by one or more step wise changes in the control signal. In one or more embodiments, the threshold rate is provided by providing a limit on the magnitude of the size of the steps applied during the end period.

In one or more embodiments, the magnitude of the step-wise changes is progressively reduced over the predetermined transition time period. In one or more embodiments, when step-wise changes are provided in the transition profile, the size of the end period is independent of a difference between a present voltage output of the voltage converter and the target voltage during the transition profile. In one or more embodiments, the controller is configured to provide for at least 2, 3, 4, 5 or 8 or 10 steps from the initial voltage output to the target voltage output.

In one or more embodiments the magnitude of one or more of the step-wise changes is based on a difference between a present control value and the second control value. Thus, the step size may be determined during the transition between the first and second control value.

In one or more embodiments the magnitude of one or more of the step-wise changes is based on the following formula;

$$(Vp-Vt)/N$$

where Vp is the present control value and Vt is the second control value and N is an integer.

In one or more embodiments N comprises a power of two.

In one or more embodiments, in respect of power convertor in which a voltage output of the power convertor is applied across an output capacitor arranged between two output terminals of the power convertor, the discharge of said capacitor defining the maximum rate at which the voltage output of the power converter decreases without an electrically connected load at the output terminals, the transition profile is configured such that the first rate of change is greater in magnitude than the maximum rate provided for by said discharge of said capacitor and the threshold rate is less than, in magnitude, the rate provided for by said capacitor at at least the target voltage output.

In one or more embodiments, the emitter element and the opto-coupler may be, more generally, a feedback element. Thus, in one or more embodiments, the feedback element is selected from a communication transformer or an emitter element and opto-coupler.

In one or more embodiments, the characteristic of the power convertor comprises a discharge profile of an output capacitor arranged between output terminals of the power converter. In one or more embodiments, the discharge profile is the discharge profile when discharging only through one or more discharge resistors of the power convertor without an electrically connected load. In other embodiments, the discharge profile includes discharging through the one or more discharge resistors of the power convertor and the load. In one or more embodiments, the threshold rate is less than (in magnitude) a rate of discharge of a capacitor arranged at the output of the power converter. It will be appreciated that the discharge rate of any capacitor that influences the voltage across the feedback element may be used to determine the size of the end period and/or threshold rate.

In one or more embodiments, the secondary side controller is configured to effect the change from the first control value to the second control value, where the target voltage is lower than the present voltage, over a time period longer than the time taken for said output capacitor to discharge from the present voltage to the target voltage when not connected to a load. In one or more embodiments, the secondary side controller is configured to effect the change from the first control value to the second control value in a time less than or equal to the transition time period.

In one or more embodiments, the end period comprises at least an instant at the end of the transition time period. In one or more embodiments, the temporal size of end time period is based on a (performance) characteristic of the opto-coupler and/or the power converter such as the rate of discharge of a capacitor electrically connected between output terminals of the power converter.

In one or more embodiments, in respect of power convertor in which a voltage output of the power convertor is applied across an output capacitor arranged between two output terminals of the power convertor, the discharge of said capacitor through a discharge resistor of the power convertor defining the maximum rate at which the voltage output of the power converter decreases when the power convertor is not connected to a load, the transition profile is configured such that the first rate of change is greater in magnitude than the rate provided for by said capacitor and the threshold rate is less, in magnitude, than the rate provided for by said discharge of the capacitor at the target voltage output.

In one or more embodiments the control signal, over the transition profile, is configured such that towards the end of the end time period, the control signal is driven beyond the second control value by an offset value and, subsequently, the control signal is returned to effect the transition to the second control value by an end of the end time period. This may be advantageous as the control signal is driven similar to a critically damped system which may assist in arriving, stably, at the second control value.

In one or more embodiments the secondary side controller is configured to operate with a power converter in which the emitter element is configured to provide a greater optical output when the voltage output of the power converter is greater than the target value relative to when the voltage output of the power converter is less than the target value, and the secondary side controller is configured to provide said control signal in accordance with the transition profile based on the occurrence of a requested reduction in the voltage output of the power converter. Thus, in some examples, on a requested increase in the voltage output, the transition profile is not implemented.

In one or more embodiments a first time period over which the control signal changes with the first rate of change is within a first half of the transition time period. In one or more embodiments, the first time period is within the first 10%, 20%, 30%, 40%, 50% of the transition time period.

In one or more embodiments the first rate of change (such as provided by one or more voltage step changes) is selected to provide for a change in the voltage output of the power converter of at least 80% of an initial difference between the present voltage output of the power converter and a target voltage (i.e. the difference between the first and second control values). In one or more embodiments, the percentage of the initial difference could alternatively be at least 50%, 60%, 70% or 90%.

In one or more embodiments the requested target voltage output of the power converter comprises one of a number of predetermined voltage levels provided by the power converter. In one or more embodiments, said predetermined voltage levels are define by a USB power delivery standard.

According to a second aspect of the disclosure, we provide a power converter comprising a primary side and a secondary side connected by windings, a primary side controller configured to control a switching element to provide for charging and discharging of a charge storage element in response to a feedback signal, a secondary side controller in accordance with the first aspect and an opto-coupler configured to receive the control signal of the secondary side controller and in response thereto provide the feedback signal to the primary side controller for controlling the voltage output of the power convertor.

According to a third aspect of the disclosure, we provide a Universal Serial Bus charger including the power converter of the second aspect configured to provide power to a load when connected to the charger.

According to a fourth aspect of the disclosure, we provide a method of providing a transition between an first control value configured to provide an initial voltage output by a power converter and a second control value configured to provide a requested target voltage for output by the power converter, the method comprising, based on at least the first control value and the second control value, providing a control signal to an emitter element of an opto-coupler in accordance with a transition profile over a predetermined transition time period to effect a change in the voltage output of the convertor, the transition profile comprising at least a first rate of change in the control signal followed by an end time period leading to the end of the transition time period prior to the voltage output of the converter reaching the target voltage output in which the rate of change in the control signal is less than a threshold rate based on a characteristic of the opto-coupler and/or the power converter with which the controller is rated to operate, the first rate of change greater than the threshold rate of change.

This method is advantageous in respect of a power convertor comprising a primary side controller configured to control a switching element to provide for charging and discharging of a charge storage element in response to a feedback signal, a secondary side controller configured to perform the method and an opto-coupler configured to receive the control signal and in response thereto provide the feedback signal to the primary side controller for controlling the voltage output of the power convertor.

In one or more embodiments the method includes providing the transition profile in which, during the transition profile, the control signal is provided to pass the second control value and return thereto by the end of the transition time period.

In one or more embodiments the method includes providing the transition profile by a plurality of step-wise changes in the control signal, the first rate of change provided by one or more step changes over time and the threshold rate provided by a limit on the magnitude of each of the one or more step-wise changes provided during the end period.

According to a fifth aspect of the present disclosure there is provided a secondary side controller for a power converter configured to provide a control signal to an emitter element of an opto-coupler for control of a primary side controller of the power converter, the secondary side controller configured to operate with the primary side controller for controlling the voltage output of the power converter, the secondary side controller in combination with an opto-coupler and configured to, based on;

a first control value configured to instruct the power converter to output its present voltage output; and a second control value configured to instruct the power converter to provide a requested target voltage output;

provide said control signal in accordance with a transition profile over a predetermined transition time period to effect a change between the first control value and the second control value, the transition profile configured such that at 50% through the transition time period the control signal is adjusted by at least 55% and less than 99% of the difference between the first control value and the second control value.

In one or more examples, the transition profile is configured such that at 50% through the transition time period the control signal is adjusted by at least 60%, 65%, 70%, 75%, 80%, 85%, 90% or 95% of the difference between the first control value and the second control value. In one or more examples, the transition profile is configured such that at 50% through the transition time period the control signal is adjusted by less than 60%, 65%, 70%, 75%, 80%, 85%, 90%, 93%, 95% or 97% of the difference between the first control value and the second control value.

In one or more examples, the transition profile is configured such that at 90% through the transition time period the control signal is adjusted by at least 92%, 94%, 96%, 98%, 99% or 100% of the difference between the first control value and the second control value.

In one or more examples, the transition profile is configured such that at 75% through the transition time period the control signal is adjusted by at least 80%, 85%, 90%, 95%, 99% or 100% of the difference between the first control value and the second control value.

In one or more examples, the transition profile is configured such that at 25% through the transition time period the control signal is adjusted by at least 26%, 30%, 35%, 40%, 45% or 50% of the difference between the first control value and the second control value. In one or more examples, the transition profile is configured such that at 25% through the transition time period the control signal is adjusted by less than 100%, 95%, 90%, 85%, 80%, 75%, 70%, 65%, 60% or 55% of the difference between the first control value and the second control value.

It will be appreciated that the optional features of the first aspect, including the optional provision of a first rate of change, the end period and a threshold rate based on characteristics of the opto-coupler/power converter, are equally applicable to this aspect.

In one or more embodiments, the transition time period is a fixed predetermined period. In one or more embodiments, the transition profile is configured such that by the end of the transition time period the opto-coupler is not experiencing saturation and is able to provide voltage regulation for the power converter.

According to a sixth aspect of the disclosure, we provide a power converter comprising a primary side and a secondary side connected by windings, a primary side controller configured to control a switching element to provide for charging and discharging of a charge storage element in response to a feedback signal, a secondary side controller in accordance with the fifth aspect and an opto-coupler configured to receive the control signal of the secondary side controller and in response thereto provide the feedback signal to the primary side controller for controlling the voltage output of the power convertor.

According to a seventh aspect of the disclosure, we provide a Universal Serial Bus charger including the power converter of the sixth aspect configured to provide power to a load when connected to the charger.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

A power converter may comprise a primary side and a secondary side connected by windings and includes a primary side controller associated with the primary side and a secondary side controller associated with the secondary side. The controllers may be coupled by an opto-coupler and provide for a feedback signal to be at least sent to the primary side controller for regulating the voltage output and also for transitioning between predetermined voltage levels. The opto-coupler typically includes an emitter element configured to emit light that is received by a receiver element at an opposed end of the opto-coupler. The emitter element may comprise a Light Emitting Diode (LED). The LED may have a limited bandwidth and may become saturated under certain conditions, such as when the voltage difference across it exceeds a predetermined amount. If the LED becomes saturated it may not be able to provide for effective feedback during the time it is saturated thereby potentially leading to the power converter providing an unregulated power output. The feedback signal may be provided based on integration of measured values and errors in the values used as part of the integration may cause errors in the feedback signal that may persist at times where regulation of the feedback is necessary.

Modern USB chargers typically use power converters, such as switched mode power supplies, to provide different predetermined output voltage levels for powering and/or charging an energy store (e.g. electrochemical battery) of a load. The output voltage level may be set via a negotiation between the USB charger and a load device using a particular communication protocol. Accordingly a USB charger can provide voltage levels different to and/or in excess of the limited available power available from a standard USB port or USB charger adhering to the Battery Charging 1.2 specification, where the voltage is limited to 5V and the maximum current to 500 mA (USB-2.x), 900 mA (USB-3.x) or 1.5 A (BC1.2).

In most of the known communication protocols, such as USB Power Delivery (USB-PD), Quick Charge (QC), HiSilicon (HS), AFC, FCP, SCP, etc, time limits are specified for the time allowed for a transition between the predetermined voltage levels to complete (either up or down). Further, usually, the connected load device is not allowed to draw more than a certain amount of current during a transition, but is allowed to draw a negotiated amount of current immediately after the transition has finished. This poses a challenge on the regulation speed of a voltage control loop used in power converters that have application in charging load devices.

As mentioned above the voltage control in power convertors may be provided by the secondary side controller providing a control signal to an opto-coupler which thereby provides a feedback signal to a primary side controller. A common arrangement of said opto-coupler is such that the current through the opto-coupler is high when the regulated output voltage of the power converter is above a target value relative to a low current (or no current) when the output voltage of the power converter is below a target value.

In such an arrangement, it has been found that on a relatively fast transition from a higher output voltage to a lower, target, voltage due to the (intended) limited bandwidth of the loop, the opto-coupler may experience saturation, if the voltage step is made instantly, the output voltage may show an unacceptable dip before reaching its final value. If on the other hand, to prevent such dip, the voltage is regulated down in a controlled manner by decreasing linearly the control signal applied to the opto-coupler, the output voltage may have substantially the same shape as the control signal provided by the secondary side controller. However, it has been seen that heavy saturation of the opto-coupler during a certain amount of time after the power converter output voltage has reached its and value can occur. If, while the opto-coupler is experiencing saturation, the load begins to draw its negotiated current (known as a current load step), the output voltage of the power converter will still show a dip after all because the loop is "blind" to said current load step as long as the feedback loop is in saturation. The time constraints put on the maximum transition time between predetermined voltage levels defined by the various communication protocols mentioned above, which is usually not more than a few hundred milliseconds, poses a challenge for opto-coupler based feedback controllers.

Figure 1:
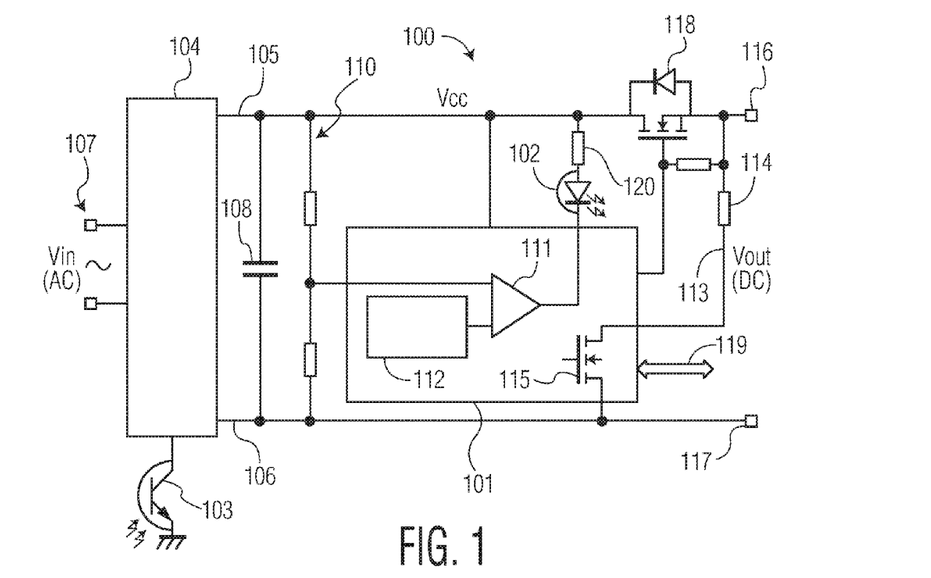
FIG. 1 shows an example embodiment of a secondary side controller within an power converter.

FIG. 1 shows a power converter 100 and, in particular, a secondary side controller 101 thereof configured to provide a control signal to an emitter element 102 of an opto-coupler. The emitter element is configured to emit a feedback signal based on the control signal to a receiver element 103 of the opto-coupler. The receiver element 103 is connected to a primary side controller that is shown as a box 104, the box 104 also designating the primary side of a power converter and windings. The output from the windings comprises a voltage output of the converter Vcc at terminal 105 and a reference voltage terminal 106 (such as a ground terminal). The box 104 may have mains supply terminals 107 to receive an AC voltage as the input to the power converter. The power converter may be a switched mode power supply. Accordingly, the power converter typically includes a rectifier, one or more switching elements to reconfigure current paths therein and charge one or more charge storage elements, the rectified voltage of the supply and the voltage across the charge storage elements applied to the windings for transfer to the secondary side. The primary side controller is typically configured to control the switching element(s) in response to the feedback signal received via the receiver element 103 of the opto-coupler to provide for different voltage levels at the output 105 and/or regulation of the voltage output. Accordingly, the control signal generated by the secondary side controller 101 may be configured to control the voltage output of the power converter via the opto-coupler (providing electrical isolation between primary and secondary sides) and the primary side controller.

A capacitor 108 is shown between the output terminal 105 of the windings and the reference voltage terminal 106. The secondary side controller 101, in this example, is configured to receive the converter output voltage via a voltage divider 110.

The power converter 100 includes a voltage output terminal 116 and a reference terminal 117 for connection to a load. The load may include a charge storage element, such as a capacitor or an electrochemical battery that may be charged from the power converter.

The secondary side controller comprises a control loop amplifier 111, having as inputs the voltage divided version of Vcc and a reference voltage, generated by the loop reference block 112. The loop amplifier 111 provides a control signal to drive current through the emitter element (LED) of the opto-coupler so as to transition to a requested target voltage, as will be described in more detail below. The loop reference block 112 is configured to provide a transition profile to control the shape (with respect to time) of the control signal during its transition to effect the request target voltage over a transition time period. It will be appreciated that the control value of the control signal has a direct relationship to the voltage output of the power converter and therefore the control value provided by the control signal may, in general regulated use, be used interchangeably with the voltage output of the power converter.

In order to have a fast discharge a discharge path 113 is provided including a resistor 114 and a switch 115 to a reference voltage or ground is present. A switch 118 in series between terminal 105 and the voltage output terminal 116 of the power converter 100 is provided and can be used to disconnect the load from the power converter 100.

The secondary side controller 100 may be in communication with the load, shown schematically by arrow 119. The load, in accordance with the USB Power Delivery protocol or a similar protocol (as mentioned above), may provide requests to the power convertor 100 for a particular voltage output, which forms the requested target voltage output of the secondary side controller 101.

Accordingly, control of the signal provided to the amplifier 111 in accordance with a transition profile, by loop reference block 112, provides for generation of a control signal that is applied to the emitter element 102 by the second side controller 101. The emitter element 102 comprises two terminals and, at its first terminal, is configured to receive a supply voltage representative of the output voltage of the convertor, Vcc via an optional resistor 120, and, at its other terminal, the control signal. Accordingly, the voltage of the control signal relative to the voltage output by the converter controls the light emitted by the emitter element 102.

It will be appreciated that the emitter element 102 may be provided with the control signal in a different configuration provided that the control signal can effectively provide feedback to the primary side controller via the opto-coupler.

Figure 2:
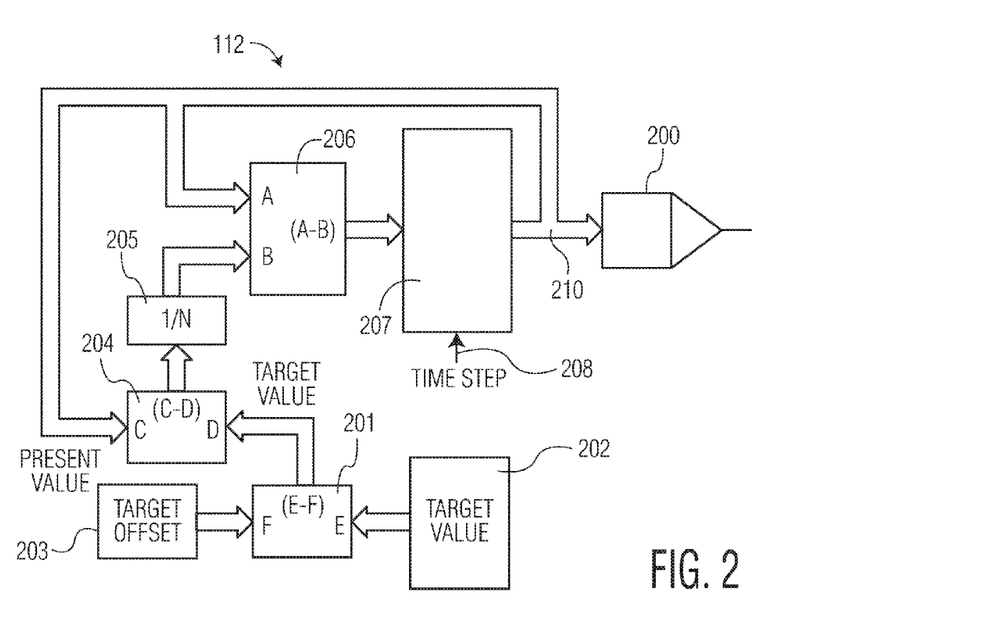
FIG. 2 shows an example embodiment of part of the secondary side controller to implement a transition profile.
Figure 3:
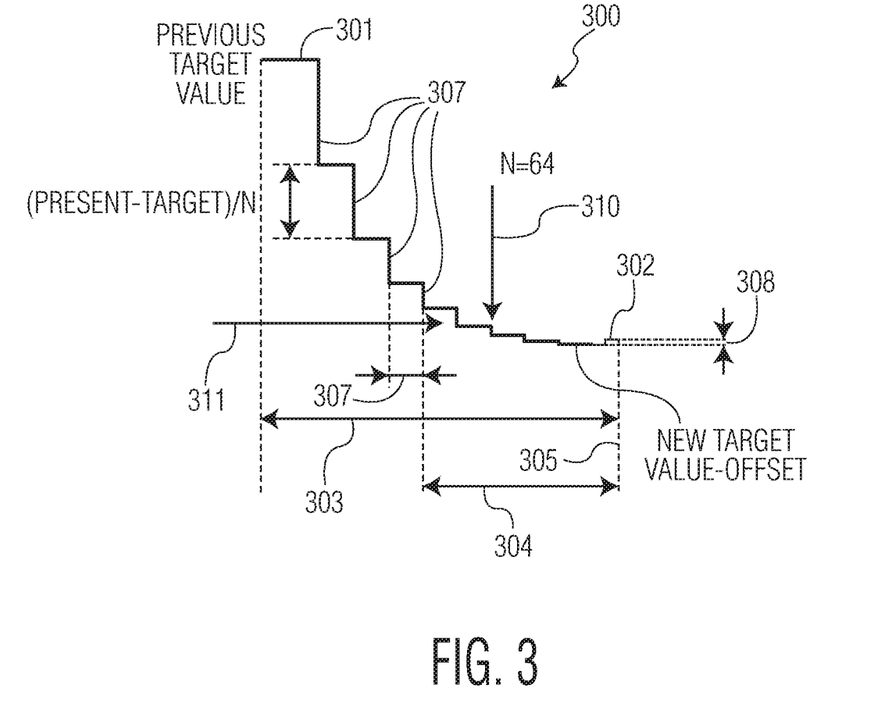
FIG. 3 shows an example transition profile.

FIGS. 2 and 3 show an example implementation of the loop reference block 112 in which the secondary side controller 101 provides a transition profile in which the rate of change in the control signal is progressively reduced over the transition time period.

Turning first to FIG. 3, a transition profile 300 is shown comprising how the control signal generated by the secondary side controller 101 is provided to the emitter element 102 over time (horizontal axis) during its transition from a first control signal 301 associated with an initial voltage output to a second control signal 302 associated with a requested target voltage output over a transition period 303. It will be appreciated that the rate of change in the control signal (at least when considered averaged over a time step) progressively decreases over the transition period. Thus, initially, the rate of change in the control signal is high comprising at least a first (high) rate of change. However, in an end time period 304 leading to the end 305 of the transition time period, the rate of change in the control signal is lower than the first rate of change and, in particular, below a threshold rate of change. This is advantageous as by providing an end time period in which the rate of change in the control signal is maintained below a threshold rate may act to prevent the emitter element from experiencing saturation by the end 305 of the transition time period. Accordingly, when the load begins to draw current at some point after the end 305 of the transition time period, the control loop that is provided by the secondary side controller 112, the opto-coupler 102 and primary side controller can regulate the voltage effectively. In this example, which provides for step wise changes in the control signal, the size of the steps provided during the end period 304 is limited to provide the threshold rate to reduce the risk of the opto-coupler experiencing saturation by the end of the time period 303.

The threshold rate may be provided for by limiting the size of the step changes per step and/or the time between steps. The threshold rate may be up 250 mV/ms or 150, 200, 225, 275 or 300 mV/ms.

The voltage difference when changing between voltage levels is typically at least 3 Volts or between 3 or 4 and 15 Volts. Examples of USB Charging voltage transitions include 20 Volts to 5 Volts or 12 Volts to 9 Volts. The time period over which a voltage transition may be implemented, according to a charging standard as mentioned above is typically between 100 and 500 milliseconds. The length of the end period, where the rate of change is below the threshold, is typically at least 50 milliseconds.

In the example of FIG. 3, the control signal transitions from a first value 301 (which provides for the voltage converter outputting a voltage at an initial level) to a second value 308 (which may be configured to provide for the voltage converter outputting a voltage at the requested target voltage level) in a step-wise manner i.e. over a plurality of steps 307. In one or more examples, the control signal may be configured to pass the target level by a predetermined offset amount before returning to the target level. In one or more examples, the magnitude of the step changes in voltage are reduced over the transition time period, such as at least over 10 or 20% or more of the transition time period. Thus, on receipt of a target voltage level, the second side controller is configured to transition thereto over a transition time period of at least 100 milliseconds or at least 275 ms.

By providing an abrupt change in voltage at the beginning of the transition time period (i.e. the first rate of change), the slower rate of change in the end time period allows for the emitter element (if saturated by the abrupt rate of change) to recover, such as before the end of transition time period. Accordingly, the opto-coupler is able to provide for regulation of the voltage output by the power converter when the load begins to draw current.

The step-wise reduction in the rate of change of the control signal, defined by the voltage change represented by each step, may decrease in a substantially parabolic or substantially exponential manner. Progressively reducing the step size over the transition period has been found to be particularly effective at reducing the risk of the emitter element experiencing saturation by the end of the transition period.

The number of step changes 307 in voltage between the first value 301 and the second value 302 may be at least 5, 6, 7, 8, 9, 10, 15, 20 or more. It will be appreciated that the number of steps may affect the effective rate of change in the control signal. Accordingly, the number of steps may be configured to provide the desired rate of change over the desired time periods of the transition time period.

In the example of FIG. 3, the transition time period 303 is substantially 275 ms. At least 5 or at least 7 or substantially 9 voltage steps are provided to transition between the first and second control value. The time between voltage steps (the time step period 306), in this example, is substantially fixed, although in other examples it may vary. The time step period 306 may be at least or less than 1 ms. In one or more examples, the time step is between 200 µs and 1.5 ms, or 300 µs and 1 ms, such as 625 µs.

In one or more embodiments, the transition profile may be determined based on the first control value and a second control value comprising a requested target control value. Thus, the shape of the transition profile is determined in response to the receipt of the second control value. Alternatively, in one or more examples, the transition profile is determined based on a present control value corresponding to a present voltage output of the voltage converter while the transition is underway rather than the initial control value at the start of the transition.

Thus, the size of a voltage step made as part of the transition profile comprises;

$$(Vp-Vt)/N$$

where Vp comprises a present control value and Vt comprises the target second control value and N comprises an integer. It will be appreciated that given the control value is related to the voltage output of the power converter, Vp may comprise the current voltage output of the power converter and the Vt may comprise the requested voltage output of the power converter.

The value of N is selected to provide a transition profile of an appropriate shape over the transition time period. The value of N may control the shape of the curve such that during the end time period, the rate of change is below the threshold rate. In this example, N is 64. In other examples, the value of N may be at least 8, 16, 24, 32, 48, 64, 128, for example. In other examples, the value of N may be $2^x$ where x is an integer. It may be advantageous to use a value of N which is a power of 2 when implementing the transition profile digitally. However, values of N that are not powers of 2 are possible.

It will be appreciated that the size of a voltage step, particularly towards the end of the transition time period, affects how close to the target second control value the controller will get. As part of various charging standards, tolerances are defined and accordingly, the controller may be configured to provide the second control signal (and thus output voltage) within the defined tolerance. It will also be appreciated that the reduction in the voltage steps over the transition time period and in particular the time at which, during the transition time period, the progressive reduction in the magnitude of the voltage steps is initiated is independent of the defined tolerance. In particular, the initiation of the progressive reduction in the magnitude of the voltage steps may occur at least 10, 20, 30, 40 or 50% of the transition time period before the end of the transition time period.

In one or more examples, the transition profile is configured to overshoot the requested second control value by a predetermined offset 308 within the transition time period. The overshoot may subsist for less than 5 or less than 3 or less than 2 or 1 time step period. Expressed as a percentage of the transition time period, the overshoot may subsist for less than the final 10% or 5% of the transition time period. The return to the target, second control value may assist in ensuring that the emitter element is recovered from any potential saturation by the end of the transition time period. The offset may comprise less than 0.5 Volts or more preferably less than 0.25 Volts. Expressed as a percentage of the Voltage change between the initial voltage and the requested target voltage, the offset is less than 10% or more preferably less than 5%.

Arrow 310 marks a point during the transition time period that is 50% through the period. Arrow 311 marks the value of the control signal at this 50% point. Arrow 311 shows that the control value is more than 50% of its way to the target 308 by the point marked by arrow 310 and less than 99%. Similarly, other time points may be defined through the transition time period in order to specify how much the control value has changed by that time point. It will be appreciated that it may be advantageous for the control signal to have reached a value close to the second control value earlier in the transition time period to thereby enable for a low rate of change during a final part of the transition time period. Accordingly, different time points similar to arrow 310 may be defined to specify a range of control values that are reached by the control signal at different time points.

Turning to FIG. 2, an example arrangement to implement the progressively reducing, step-wise, transition profile is shown. In this example, the transition profile is provided digitally by a series of logic elements. In other examples, the transition profile may be provided by a microcontroller. FIG. 2 shows example functional components of loop reference block 112. The loop reference block includes a digital to analogue converter 200 to provide the signal to control loop amplifier 111.

The loop reference block 112 is configured to receive the second control value comprising a control signal corresponding to a requested voltage output from another part of the secondary side controller. It will be appreciated that this target, second control value may be determined by any appropriate process and the loop reference block 112 is concerned with how (i.e. the transition profile) the transition between voltage levels is performed. Thus, a first logic block 201 receives the target value or second control value, E, from block 202, which may represent another part of the secondary side controller 101. The first logic block 201 also receives a target offset value, F, from block 203. Block 203 may comprise a memory or another part of the secondary side controller 101. The first logic block performs the equation E-F to determine an offset control value, D, that will be arrived at including the offset overshoot before returning to the target control value.

A second logic block 204 receives the offset control value from the first logic block 201 as well as a present control value, C. The present control value comprises the control value at the current time. As will be appreciated, the present control value may be derived from the voltage output of the power converter given that the control value is configured to control the voltage output Vcc. In other examples, the last used control value is stored in memory. The second logic block 204 performs the equation C-D to determine a voltage-to-offset-target value. The voltage-to-offset-target value is divided by N in a third logic block 205 to provide a voltage step size, B. It will be appreciated that given digital logic operates conveniently at powers of two, providing N equal to a power of two allows for third logic block 205 to be implemented as a shift register.

Fourth logic block 206 receives the voltage step size, B, as well as the present control value, designated A in this block, and determines the equation A-B to determine a control value to apply to the amplifier 111. The control value is received by a register block 207 which provides the control value to the DAC 200 in accordance with a time step signal 208 set to a particular time step period.

In one or more examples, the controller may be configured to actively control the time step signal to control the shape of the transition profile in accordance with the performance of the opto-coupler or components of the power converter.

The register block 207 provides the control value in accordance with the appropriate time step to the DAC 200. Signal 210 is the control value provided by block 207 and is input to DAC 200 along with subtractor inputs A and C (from 204, 206).

This transition profile comprising a step wise parabola/exponential approximation has been found to be effective at ensuring the opto-coupler control loop is in regulation by the end of the transition time period as the rate of change in the control value in the end period of the transition period may be efficiently set below the threshold rate. The progressive reduction in the step size provides for the voltage across the emitter element to reduce sufficiently by the end of the transition time period that the emitter element may not be experiencing saturation and thus effective regulation can be provided.

Figure 4:
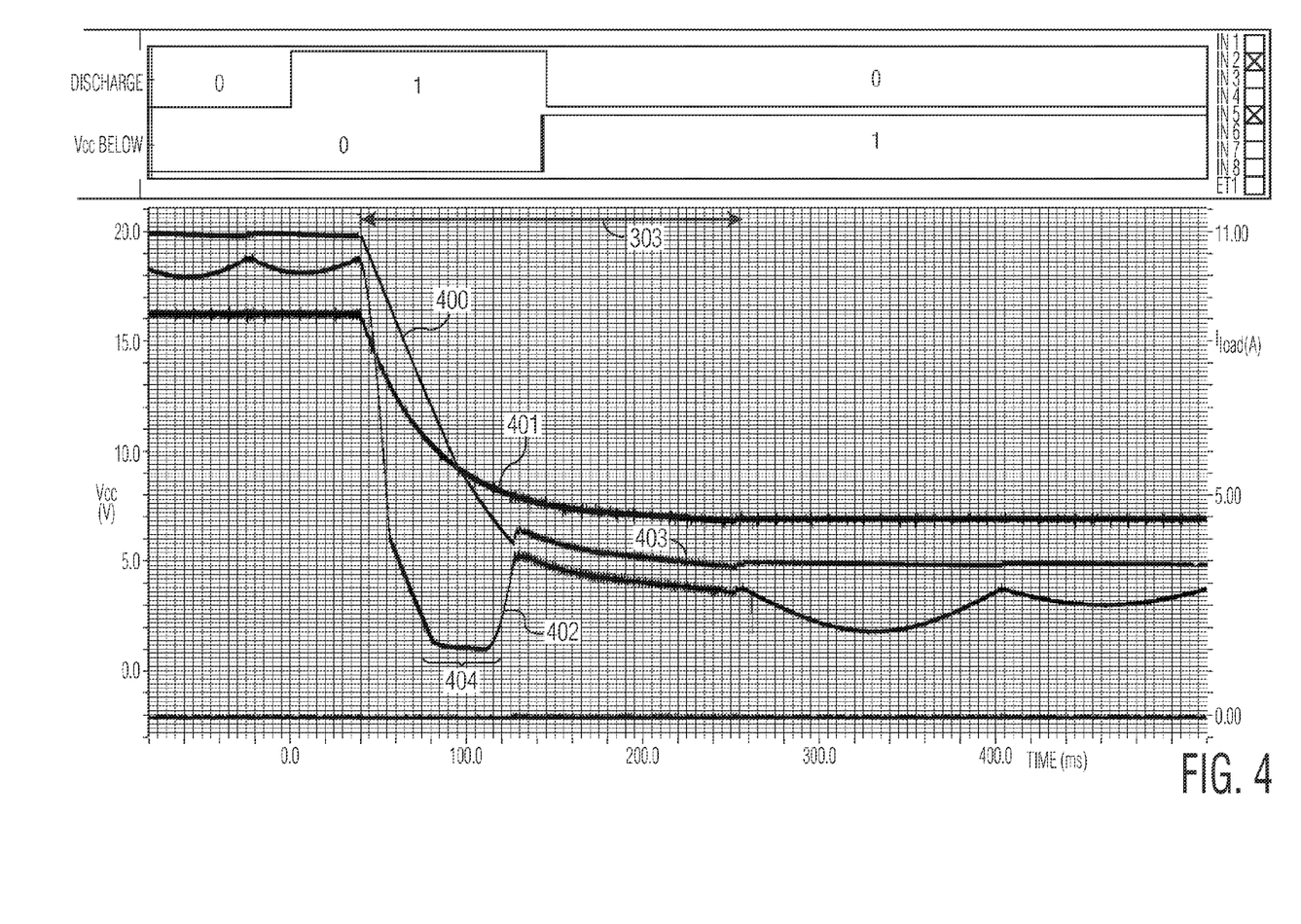
FIG. 4 shows the behaviour of the emitter element of the opto-coupler when using the example transition profile.

FIG. 4 shows a graph including plots of Vcc 400, the control signal 401 and the voltage at cathode of emitter element 402 across the emitter element 102. The transition time period 303 is also shown as well as a step-up 403 following the offset. It can be seen that following a period of saturation of the emitter element 102 at 404, the reduction in the rate of change in the control value during the end period to below the threshold rate, allows for the opto-coupler to effectively regulate by the end of the transition time period 303. It will be appreciated that the change in the output voltage Vcc of the power converter is determined by the discharge of the capacitor 108 as the initial, first rate of change in the control signal is greater (in magnitude) than the rate of change provided for by the discharge of the capacitor 108. The magnitude of rate of change is reduced over the transition time period 303 such that the magnitude of the rate of change in the control signal in the end period is less than the rate provided for by the discharge of the capacitor 108 at least at the target voltage.

Figure 5:
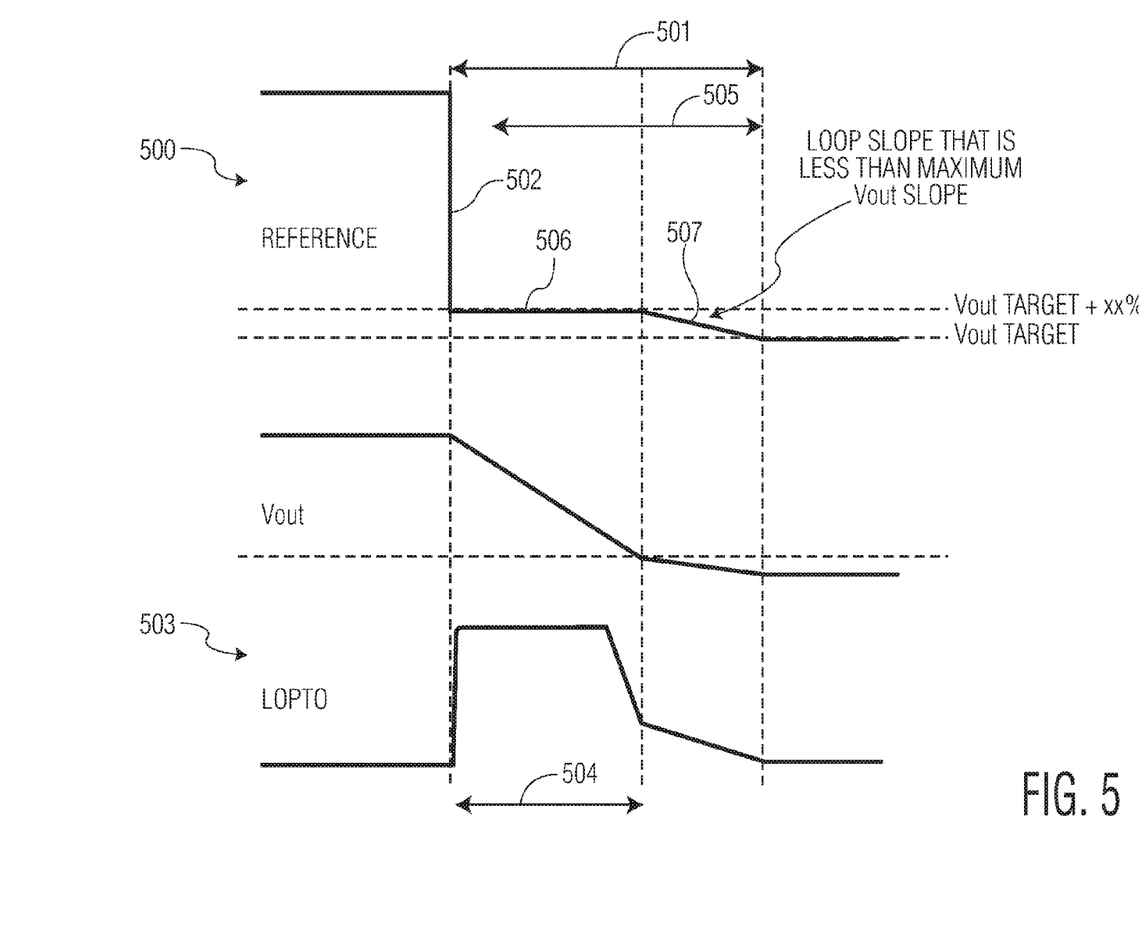
FIG. 5 shows a second example transition profile.

FIG. 5 shows a further embodiment. FIG. 5 also shows a step wise transition between the first and the second control value and wherein during an end period, the rate of change is maintained below a threshold rate. The uppermost plot 500 shows the change in the control signal over the transition time period 501. The plot 500 shows an abrupt change in the control signal at a first rate of change 502. This abrupt rate of change 502 is provided at the beginning of the transition time period. As shown in the lowermost plot 503, the emitter element 102 may experience a period of saturation 504 following the abrupt change. However, during an end period 505, the rate of change in the control signal is below a threshold rate allowing for the emitter element 102 to come out of saturation and provide from effective regulation be the end of the transition time period 501. In fact, in this example, the rate of change in the control signal following the abrupt rate of change 502, shown at 506, is substantially zero for approximately 60% of the transition time period 501. The control signal is caused to make a change equivalent to at least 70%, 80%, or 90% of the initial difference between the first control value and second control value prior to the end time period. Accordingly, following the change 502, the control signal is at a control value that provides an output voltage of the target voltage plus a tolerance percentage, labelled xx %. The value xx % may depend on the USB charging standard. Subsequently a third rate of change 507 is provided which is below a threshold rate. In this example the threshold rate is provided as the remaining difference between the present control value and the second control value over at least 90% of the transition time period (i.e. the end period 505). In this example, 50% through the transition time period, the control signal is approximately 95% of the way to the second control value. The third rate of change in this example is less than, in magnitude, the maximum discharge slope (without load) 800 at the target voltage, as will be described below.

The threshold rate, in any of the above examples, in combination with the size of the end time period, is selected to allow for recovery of the emitter element of the opto-coupler if it experiences saturation during an initial period of the transition time period. The threshold rate and/or end time period may be based on a characteristic of the emitter element and/or the power converter 100 in which it is implemented. For example, the threshold rate and/or the size of the end time period, is selected based on a discharge resistance of the output capacitor 108 arranged between the output terminals 105, 108 of the power convertor such that the transition profile drives voltage changes applied to the opto-coupler 102 rather than changes in the voltage across the output capacitor 108 (and applied to the emitter element 102 via resistor 120).

The greatest rate of change (slope is negative) that may be achieved without an electrically connected load may be when the discharge of the output capacitor 108 is provided via the discharge resistor 114. This RC discharge may be described via the following equation:

$$v_{out}(i) = v_{init} \cdot e^{\frac{-t}{R \cdot C}}$$

Figure 8:
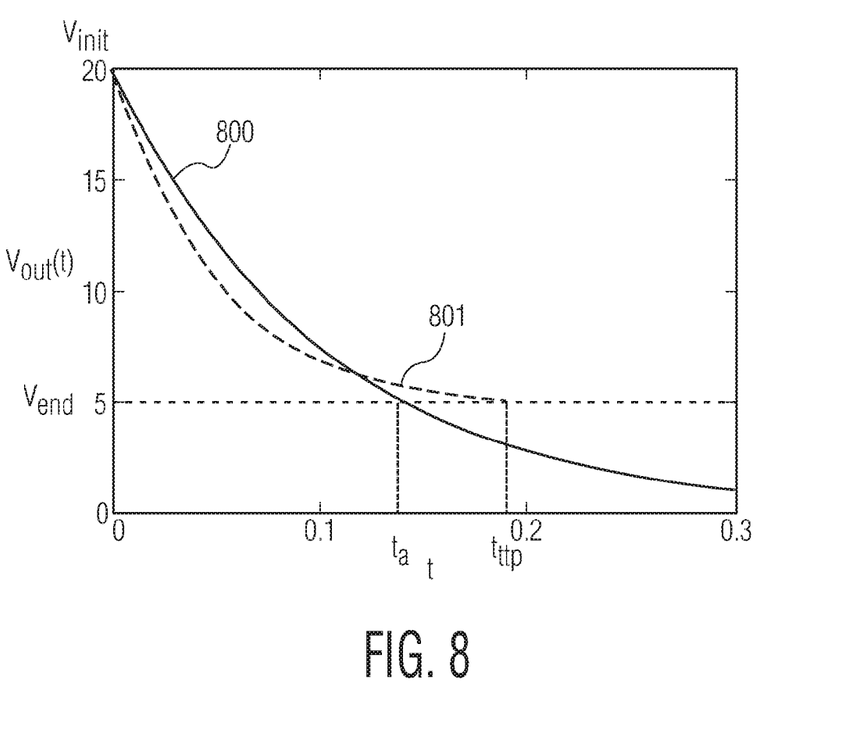
FIG. 8 shows a maximum discharge rate of an output capacitor without a load electrically connected to the power converter.

In FIG. 8 it can be seen that the magnitude of the rate of change of the RC discharge slope 800 decreases (becomes less negative as the slope is of negative sign) when the voltage Vout becomes lower. Vinit comprises the initial voltage from which the voltage transition is made i.e. the present voltage. FIG. 8 was plotted with $V_{init}$=20 V, R=100 Ohms, C=1 mF and t=0 to 0.3 seconds. The transition from 20 V to 5 V may be the greatest transition as defined by the charging standard followed. The derivative of slope 800, representing the rate of change, can be calculated and is given by the following equation;

$$\frac{d}{dt} V_{out} = \frac{V_{end}}{R \cdot C} \text{(Derivative when the end, target voltage } V_{end} \text{ is reached)}$$

It will be appreciated that this equation provides a derivative of an appropriate sign for the slope direction of the curve. Thus, while the magnitude of the rate of change may decrease over time, the actual rate of change will become less negative (i.e. increase).

In some examples, in order for saturation to be avoided and effective voltage regulation to be provided, it may be beneficial to provide a transition profile 801 in which the discharge of the capacitor 108 is determined by the control signal rather than the capacitor's inherent "no load" discharge slope 800 at least at the end of the transition time period and optionally for a temporally greater end period. So, in one or more examples, the threshold rate of change may be smaller in magnitude (or, because the slope is negative, greater in absolute terms) than the slope of the curve 800 at the lowest/target voltage $V_{end}$ where:

$$\text{threshold rate} > -\frac{V_{end}}{R.C}$$

Where $V_{end}$ is the desired voltage output of the power convertor, R comprises the resistance of the one or more resistor(s) through which the output capacitor discharges, and C comprises the capacitance of the output capacitor 108. It will be appreciated that this equation provides a derivative of an appropriate sign for the negative slope direction of the curve. Thus, the magnitude of the threshold rate may be less than the magnitude of $V_{end}$/RC.

The discharge slope shown in FIG. 8 is when there is no load on the converter 100 and the capacitor 108 is discharged via the discharge resistor 114 (and the resistors of the voltage divider). It can be seen that this is the worst case situation to fulfil the above threshold rate requirement (because with load the discharge slope will be steeper). In other examples, discharge through a load may be considered. Accordingly, the threshold rate may be less than, in magnitude, a value based on $$\frac{V_{end}}{R.C}.$$

For example, in embodiments where discharge of the capacitor is provided, in part, through the load, the threshold rate may be based on one or more of a component based on $$\frac{V_{end}}{R.C}$$

and a component based on the rate of discharge through the load.

In one or more examples, providing a transition profile that is non-linear may be advantageous such as a parabolic slope or a plurality of piece-wise linear sections. In some examples, the first rate of change may be greater in magnitude (more negative) than the discharge 800 determined by the discharge of the output capacitor 108 through the resistor(s) 114. The first rate of change may be greater than the discharge rate of capacitor 108 at the present voltage or a highest rated voltage, such as the rate at $V_{init}$. This results in the slope 800 being followed during the time period in which the first rate of change is applied. However, the use of a threshold rate during the end time period provides for control of the output voltage of the power convertor by changes in the control signal because the threshold rate is lower in magnitude that the rate of change of the slope 800 at the target voltage $V_{end}$.

In one or more embodiments, where the discharge of said capacitor 108 through one or more resistances at the output of the power convertor defines the maximum rate at which the voltage output of the power converter 100 decreases when the power converter is not connected to the load, the transition profile is configured such that the first rate of change is greater in magnitude than the discharge rate provided for by said capacitor, i.e. initially a greater rate of change than that shown by slope 800. Subsequently, the transition profile, at the end of the transition time period and/or during the end time period, may provide the threshold rate at a value that is lower in magnitude than the discharge rate provided for by said discharge of the capacitor at the target voltage thereby making a transition between utilizing the maximum rate at which the output capacitor can discharge followed by a period in which the control signal provided by the controller 101 is the limiting factor in how quickly the output capacitor 108 discharges.

The amount of time the power converter 100 (including controller 101) is in control of the output voltage before the end of the transition time period may be defined by when the transition profile curve 801 crosses the curve 800, i.e. the time between the crossing point and $t_{tp}$. In some examples, the threshold rate may be provided at end of the transition time period. Thus, end period may be an instant at the end of the transition time period. In other examples, the end period may be a greater period of time, which may be advantageous. The period $t_a$ defined by the capacitor discharge is shorter than the transition time period $t_{tp}$ thereby providing an end period in which the transition profile controls the voltage output of the power converter.

Figure 6:
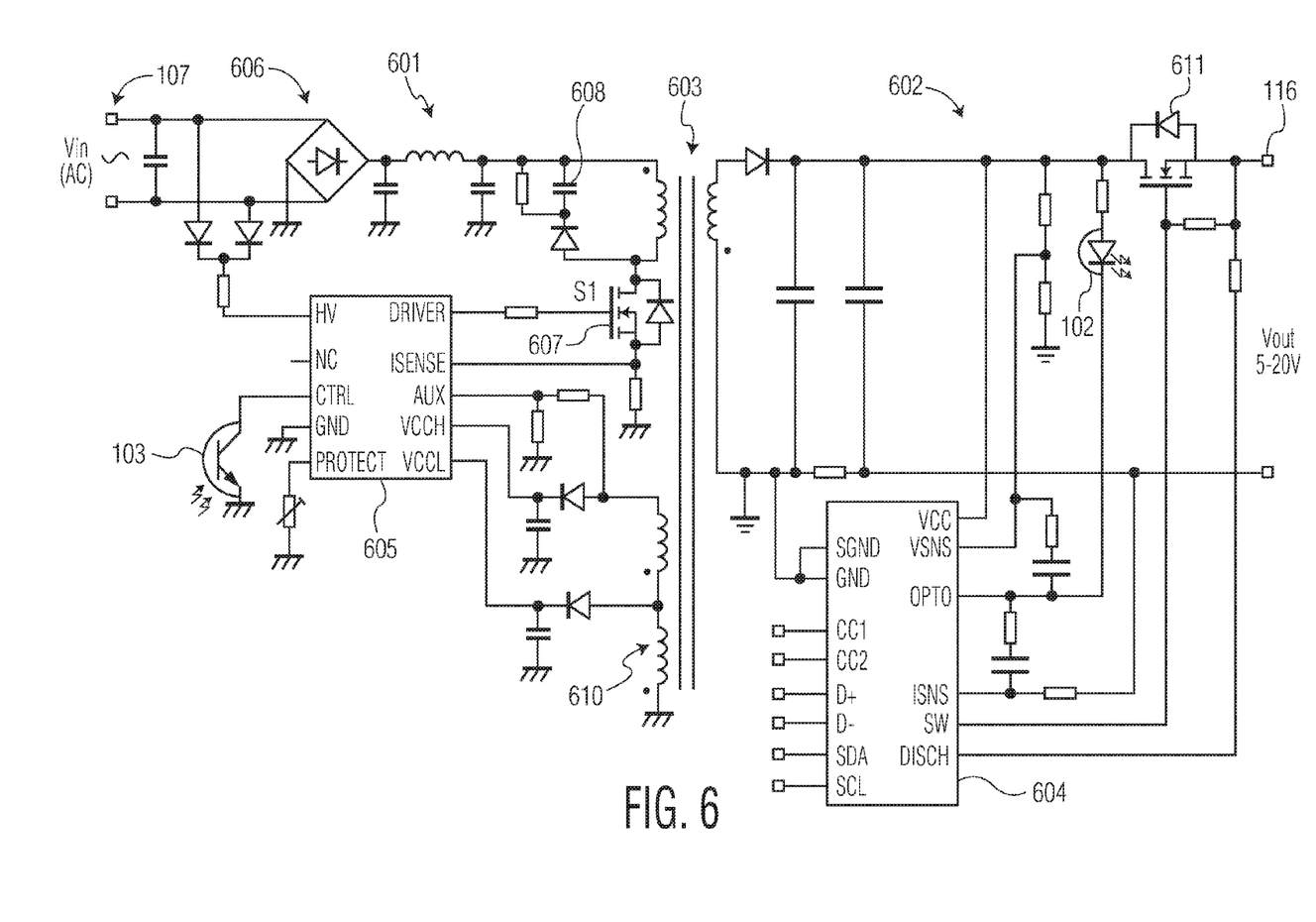
FIG. 6 shows a detailed example of power converter including the secondary side controller.

FIG. 6 shows the power converter 100 in more detail. The power converter 100 includes a primary side 601 and a secondary side 602 connected by windings 603. The secondary side 602 includes the secondary side controller 604, which provides the control signal to emitter element 102. As described above in relation to FIG. 1, the emitter element 102 provides an optical feedback signal to a primary side controller 605 via the receiver element 103. The primary side 601 includes a rectifier 606 and a switching element 607 controlled by the primary side controller 805 to cause the charging and discharging of charge storage element 608 to provide a current to the windings 603 for transfer of power to the secondary side 602. The power converter, in this example, also includes auxiliary windings 610, which will not be described in more detail here. The secondary side 602 further includes a load disconnection switch 611 to control when the voltage output of the power converter is applied to the load.

In other examples, the transition profile is implemented using analogue components rather than digitally in a stepwise manner. For example, the discharging of a capacitor may be used to control the transition between a first control value and a second control value.

Figure 7:
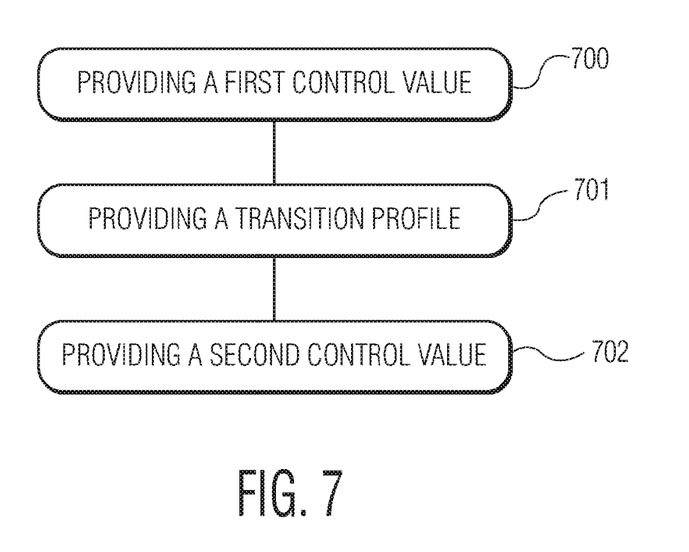
FIG. 7 shows an example method.

FIG. 7 shows a flow chart illustrating an embodiment of the method. The method comprises providing a first control value 700 to instruct a power converter to output a particular voltage. The method comprises, in response to receipt of a requested voltage output, providing a control signal to an emitter element of an opto-coupler in accordance with a transition profile 701 over a predetermined transition time period to effect a change in the voltage output of the convertor, the transition profile comprising at least a first rate of change in the control signal followed by an end time period leading to the end of the transition time period prior to the voltage output of the converter reaching the target voltage output in which the rate of change in the control signal is less than a threshold rate based on a characteristic of the opto-coupler and/or the power converter with which the controller is rated to operate, the first rate of change greater than the threshold rate of change. Alternatively the transition profile may be effected by ensuring the control signal is within predetermined ranges at one or more time points over the transition time period, such as 50%, 25% or 75% or others. The method further comprises providing a second control value 702 to instruct the power converter to output a particular voltage comprising the requested voltage output.

In the above description, the power convertor uses an opto-coupler to provide for feedback to the primary side controller. However, it will be appreciated that feedback to the primary side can also be done by, for example, a communication transformer. In this case an integrator in the feedback loop of the secondary side controller may be at the wrong value which results in the same effect as with an opto-coupler based feedback. Thus, power converters having integrators in their feedback loops may benefit from the secondary side controller.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A secondary side controller for a power converter configured to provide a control signal to a feedback element for control of a primary side controller of the power converter, the secondary side controller configured to operate with the primary side controller for controlling a voltage output of the power converter and provide said control signal in accordance with a transition profile over a predetermined transition time period to effect a change between a first control value and a second control value, wherein the first control value is configured to instruct the power converter to output its present voltage output, the second control value is configured to instruct the power converter to provide a requested target voltage output; the transition profile providing a step-wise reduction in a rate of change of the control signal in a parabolic manner from a first rate of change in the control signal in a first time period to a second rate of change in the control signal in an end time period, a magnitude of the second rate of change is less than a threshold rate of change, the threshold rate of change and/or a size of the end time period is based on a characteristic of the power converter; the first rate of change is greater in magnitude than the threshold rate of change; and the threshold rate of change is a rate of change that places the feedback element into saturation.

2. The secondary side controller of claim 1, wherein the characteristic of the power converter comprises a discharge profile of at least an output capacitor arranged between output terminals of the power converter.

3. The secondary side controller of claim 1, wherein the transition profile comprises a progressive reduction in the first rate of change in the control signal over at least 50% of the transition time period.

4. The secondary side controller of claim 1, wherein the transition profile provides progressive step-wise reduction in the parabolic manner of the rate of change of the control signal in the parabolic manner over the transition time period.

5. The secondary side controller of claim 4, wherein the magnitude of one or more of the step-wise changes is based on a difference between a current control value and the second control value.

6. The secondary side controller of claim 5, wherein the magnitude of one or more of the step-wise changes is based on the following formula;

$$(Vp-Vt)/N$$

where $Vp$ is a present control value and $Vt$ is the second control value and $N$ is an integer.

7. The secondary side controller of claim 1, wherein the voltage output of the power converter is applied across an output capacitor arranged between two output terminals of the power converter, wherein a discharge of said capacitor defines a maximum rate of change at which the voltage output of the power converter decreases without an electrically connected load at the output terminals, wherein the transition profile is configured such that the first rate of change is greater in magnitude than the maximum rate of change and the threshold rate of change is less than, in magnitude, the maximum rate of change at the target voltage output.

8. The secondary side controller of claim 1, wherein before an end of the end time period, the control signal is driven beyond the second control value by an offset value and; wherein the control signal is returned to the second control value at the end of the end time period.

9. The secondary side controller of claim 1, wherein the feedback element comprises an opto-coupler having an emitter element that is configured to provide a feedback signal to the primary side controller and a greater optical output when the voltage output of the power converter is greater than the requested target voltage output relative to when the voltage output of the power converter is less than the requested target voltage output, and wherein the secondary side controller is configured to provide said control signal in accordance with the transition profile based on a requested reduction in the voltage output of the power converter.

10. The secondary side controller of claim 1, wherein the first time period over which the control signal changes with the at least first rate of change is within a first half of the transition time period.

11. The secondary side controller of claim 10, wherein the first rate of change is selected to provide for a change in the voltage output of the power converter of at least 80% of an initial difference between the first control value and the second control value.

12. The secondary side controller of claim 1, wherein the requested target voltage output of the power converter comprises one of a number of predetermined voltage levels provided by the power converter.

13. A power converter, including the secondary side controller of claim 1, comprising:
a primary side and a secondary side connected by windings;
a primary side controller configured to control a switching element to provide for charging and discharging of a charge storage element in response to a feedback signal, wherein the feedback element is configured to receive the control signal of the secondary side controller and in response provide the feedback signal to the primary side controller for controlling the voltage output of the power converter, and a transition profile over a predetermined transition time period effects a change between a first control value and a second control value, wherein the first control value is configured to instruct the power converter to output its present voltage output, the second control value is configured to instruct the power converter to provide a requested target voltage output; the transition profile providing a step-wise reduction in a rate of change of the control signal in a parabolic manner from a first rate of change in the control signal in a first time period to a second rate of change in the control signal in an end time period.

14. A Universal Serial Bus charger including the power converter of claim 13 configured to provide power to a load when connected to the charger.

15. A method of providing a transition between a first control value configured to provide an initial voltage output by a power converter and a second control value configured to provide a requested target voltage for output by the power converter, the method comprising, based on at least the first control value and the second control value;
providing a control signal to a feedback element in accordance with a transition profile over a predetermined transition time period to effect a change in the voltage output of the convertor, the transition profile providing a step-wise reduction in a rate of change of the control signal in a parabolic manner from a first rate of change in the control signal in a first time period to a second rate of change in an end time period leading to the end of the transition time period prior to the voltage output of the converter reaching the target voltage output in which the magnitude of the rate of change in the control signal is less than a threshold rate based on a characteristic of the power converter with which the controller is rated to operate, the first rate of change is greater than the threshold rate of change, and the threshold rate of change is a rate of change that places the feedback element into saturation.

* * * * *